United States Patent
Sumigawa et al.

(10) Patent No.: US 7,430,920 B2
(45) Date of Patent: Oct. 7, 2008

(54) APPARATUS FOR MEASURING A MECHANICAL QUANTITY

(75) Inventors: Takashi Sumigawa, Fukuoka (JP); Hiroyuki Ohta, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 195 days.

(21) Appl. No.: 11/303,730

(22) Filed: Dec. 16, 2005

(65) Prior Publication Data
US 2007/0151356 A1    Jul. 5, 2007

(51) Int. Cl.
G01B 7/16  (2006.01)
(52) U.S. Cl. .......................... 73/777; 73/727
(58) Field of Classification Search ............. 73/777, 73/727; 438/48; 338/5, 6
See application file for complete search history.

(56) References Cited

U.S. PATENT DOCUMENTS

| | | | | |
|---|---|---|---|---|
| 3,697,918 | A | * | 10/1972 | Orth et al. ................ 338/3 |
| 5,537,882 | A | * | 7/1996 | Ugai et al. ................ 73/727 |
| 6,143,584 | A | * | 11/2000 | Fukada et al. ............ 438/50 |
| 6,789,431 | B2 | * | 9/2004 | Ishio ....................... 73/754 |

FOREIGN PATENT DOCUMENTS

| | | |
|---|---|---|
| JP | 05-203682 | 8/1993 |
| JP | 09-264798 | 10/1997 |
| JP | 2001-187611 | 7/2001 |

OTHER PUBLICATIONS

Roy et al. "Semiconductor Layering Processes." J. Webster (ed.) Wiley Encyclopedia of Electrical and Electronics Engineering. 1999. pp. 1-26.*
U.S. Appl. No. 11/217,299, T. Sumigawa et al.

* cited by examiner

*Primary Examiner*—Edward Lefkowitz
*Assistant Examiner*—Punam Patel
(74) *Attorney, Agent, or Firm*—Townsend and Townsend and Crew LLP

(57) ABSTRACT

An apparatus structure and measurement method are provided to retain high precision and high reliability of a semiconductor mechanical quantity measuring apparatus which senses a mechanical quantity and transmits measured information wirelessly. As to a silicon substrate of the semiconductor mechanical quantity measuring apparatus, for example, a ratio of a substrate thickness to a substrate length along a measurement direction is set small, and a ratio of a substrate thickness to a substrate length along a direction perpendicular to the measurement direction is set small. The apparatus upper surface is covered with a protective member. It is possible to measure a strain along a particular direction and realize mechanical quantity measurement with less error and high precision. An impact resistance and environment resistance of the apparatus itself can be improved.

2 Claims, 14 Drawing Sheets

STRAIN MEASUREMENT DIRECTION

ELECTROMAGNETIC WAVES

⇔ STRAIN MEASUREMENT DIRECTION

APPARATUS FOR MEASURING A MECHANICAL QUANTITY

CROSS-REFERENCE TO RELATED APPLICATION

The present invention relates to the contents the application of application Ser. No. of 11/217,299 filed on Sep. 2, 2005 entitled "APPARATUS FOR MEASURING A MECHANICAL QUANTITY" by T. Sumikawa et. al.

BACKGROUND OF THE INVENTION

The present invention relates to a mechanical quantity measuring apparatus for measuring a mechanical quantity.

What is generally called an RF tag has been developed which uses an electricity supplied through electromagnetic induction to activate a circuit and thereby transmit a preset ID number wirelessly and which is beginning to be applied to a goods distribution management and a management of admission tickets. Attempts are currently under way to connect a physical quantity sensor to such an ID tag. For example, as disclosed in JP-A-2001-187611, a temperature sensor is connected to an RF tag circuit on a printed circuit board, and the temperature sensor mounted on the printed circuit board is then entirely molded with plastic to form an ID tag with a sensor. A sensor whose circuit is formed on a semiconductor substrate is disclosed in JP-A-05-203682 and JP-A-09-264798.

When a strain sensor and a mechanical quantity sensor applying the strain sensor, such as pressure sensor, vibration sensor and acceleration sensor, are connected to a circuit that uses an electricity supplied through electromagnetic induction or microwaves to transmit the result of measurement, however, the following problems characteristic of the mechanical quantity sensor arise. Similarly, when the measurement value of a sensor using a battery or the like as its power source is transmitted or received by electromagnetic waves, the following problems arise. Since various environmental influences are given depending upon usage conditions, a sensor capable of high precision measurement even under such conditions is desired. The above-described well-known techniques do not have concrete disclosure of examples of high precision measurement.

First, the strain sensor has a very small output for a measured strain and is very vulnerable to noises as compared with other sensors such as temperature sensor. For example, in normal use, the strain gauge is required to have a resolution of the order of $10^{-5}$ and a resistance variation ($\Delta R/R$) in the most commonly used resistor wire type strain gauge is about $2\times10^{-5}$. That is, the strain gauge is required to detect when the resistor, whose resistance is 1 in a no-strain condition, produces a resistance of 1.00002 when strained. At this time, if any noises enter the circuit, it may cause large measuring errors. Particularly when the apparatus is operated on an electric power supplied through electromagnetic induction or microwaves, the strain sensor is also subjected to a radio wave, making it easier for noises to enter the circuit. Further, when the electricity supplied by electromagnetic induction or microwaves is used, an amount of electricity that can be supplied to the strain sensor is limited considerably and is required to be set two or more orders of magnitude smaller than when a commonly marketed strain gauge and an amplifier are used. Thus, if the current flowing through the strain sensor is suppressed to 200 µA or smaller, the apparatus becomes susceptible to noises, substantially burying the signal in noises. The strain measurement is often made by directly attaching the sensor to an object being measured. Considering this condition of use, it is difficult to cover the sensor and its lead wires with a conductive material for perfect electromagnetic shield. In usual strain measurement, a strain quantity in a particular direction of an object being measured whose strain generation state is unknown, is required to be measured. A strain sensor is therefore desired which can detect a strain quantity in a particular direction at high precision.

It is therefor an object of the present invention to solve at least one of the above-described problems and provide a mechanical strain measuring apparatus capable of high precision measurement.

BRIEF SUMMARY OF THE INVENTION

As described above, in the mechanical quantity measuring apparatus having a strain sensor utilizing the piezoresistance effect and formed in a silicon substrate, the silicon substrate shape constituting the mechanical quantity measuring apparatus and the installation of the mechanical quantity measuring apparatus have been devised. In this manner, the apparatus capable of solving one of the problems can be configured. For example, even if a circuit operation power is supplied through electromagnetic induction or microwaves, a mechanical quantity measuring apparatus can be provided which is not susceptible to noises and can perform high precision measurement. Similarly it is possible to provide a mechanical quantity measuring apparatus which is not susceptible to noises and can perform high precision measurement, even if a battery or the like is used as a power source and a value measured with the sensor is transmitted/received through electromagnetic waves.

As a Wheatstone bridge circuit as a temperature compensation circuit is formed in a strain detector unit, the resistor shape and layout has been considered to improve a measurement precision.

A temperature dependency of a value measured with a mechanical quantity sensor using semiconductor is relatively large as compared to other mechanical quantity measurements. It is therefore essential to perform a temperature compensation as different from other sensors. Generally, temperature compensation is performed by forming a Wheatstone bridge circuit by combining strain sensors and dummy resistors having the same temperature dependency as that of the strain sensors. In this case, electromagnetic noises can be reduced considerably by forming the Wheatstone bridge on a semiconductor substrate. In order to facilitate an output amplifying process at a subsequent stage, it is preferable that an output of the Wheatstone circuit is almost 0 in a non-strain state. It is therefore preferable to make a difference of resistance values of four resistors constituting the bridge circuit as small as possible in order to make the potential at the output terminal equal as much as possible. According to another embodiment of the present invention, even if a circuit operation power is supplied through electromagnetic induction or microwaves, it is possible to provide a mechanical quantity measuring apparatus and manufacture method which is not susceptible to the influence of noises and has a small influence of temperature and a high precision.

The present invention can configure a mechanical quantity measuring apparatus capable of solving at least one of the problems.

Other objects, features and advantages of the present invention will become more apparent from the following description of embodiments of the invention when taken in conjunction with the accompanying drawings.

DETAILED DESCRIPTION OF THE INVENTION

Figure 1:
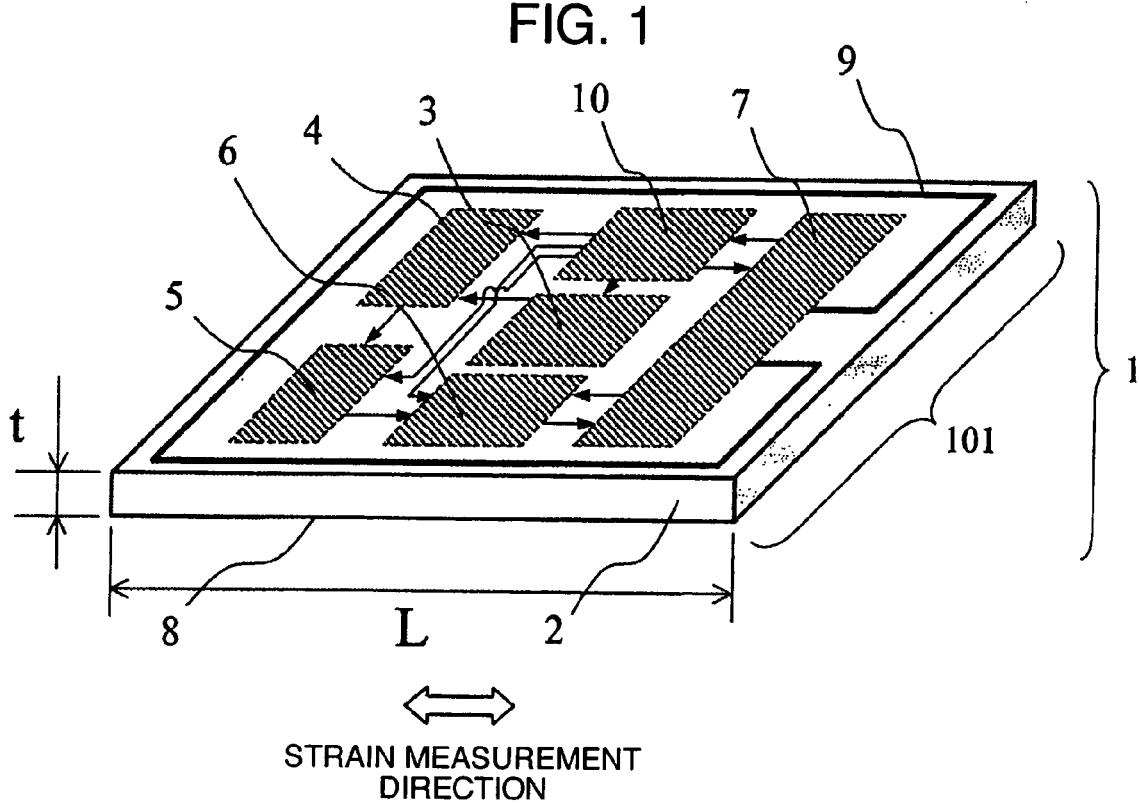
FIG. 1 is a schematic diagram showing a mechanical quantity measuring apparatus according to the present invention.
Figure 2:
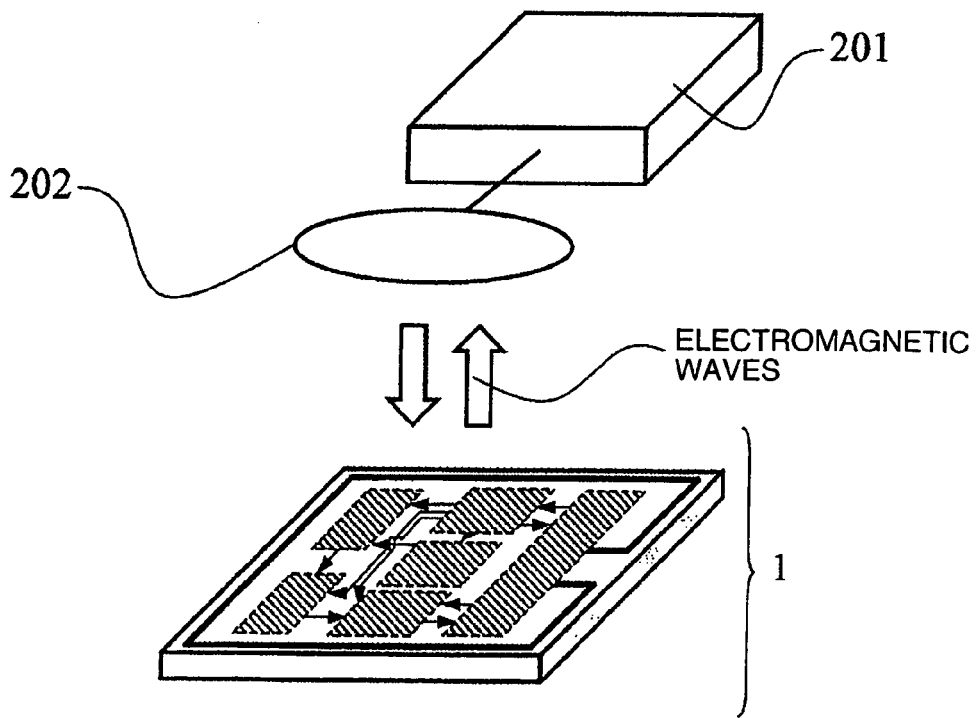
FIG. 2 is a schematic diagram illustrating communications and a power feeding method of a mechanical quantity measuring apparatus of the present invention.

Embodiments of the present invention will be described with reference to FIGS. 1 to 18. FIG. 1 shows a mechanical quantity measuring apparatus 1 used in this invention. For the mechanical quantity measuring apparatus 1, a semiconductor substrate, e.g., a single crystal silicon substrate 2 is used. The mechanical quantity measuring apparatus 1 is characterized in that formed on the substrate are at least a strain sensor 3 utilizing a piezoresistance effect, an amplifier group 4 for amplifying a voltage value obtained from the strain sensor 3, an analog/digital convertor 5, a rectifier/detector/modem circuit 6, a communication control unit 7, a bonding plane 8, an antenna 9 and a power supply device 10. The power supply device 10 may be a battery such as a storage battery and a solar battery, a power generator utilizing oscillation power generation or piezoelectric effect, or electric energy obtained from the rectifier/detector/modem circuit 6. In this embodiment, as shown in FIG. 2 the driving power source for the mechanical quantity measuring apparatus 1 uses induction electromotive force generated by electromagnetic waves supplied from a reader antenna 202 of an externally mounted reader 201. In the following, the silicon substrate 2 and a thin film group formed on the substrate are collectively called a chip 101. Although the antenna 9 may be mounted outside the chip 101, in the following the antenna 9 built in the chip 101 will be described by way of example. If the antenna 9 is built in the chip, the chip 101 corresponds to the mechanical quantity measuring apparatus 1, whereas if the antenna 9 is mounted outside the chip, the chip 101 and antenna 9 in combination are called the mechanical quantity measuring apparatus 1. Viewing the principal surface on which the circuits are formed, the transmission circuit is disposed in the area nearer to the silicon substrate end than the strain sensor, alternatively the strain sensor is disposed in the area nearer to the silicon substrate center area than other circuits.

Figure 3:
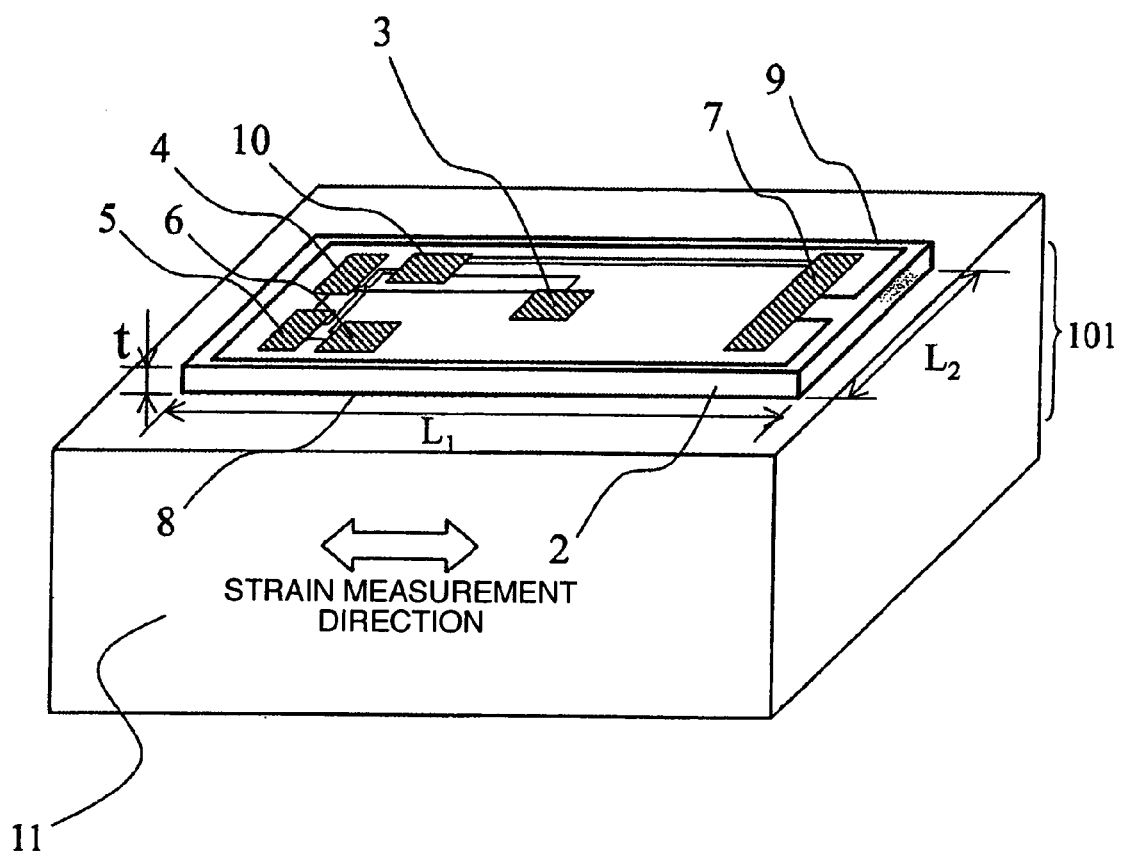
FIG. 3 is a diagram showing the shape of a mechanical quantity measuring apparatus according to a first embodiment of the present invention.

The first embodiment of the present invention will be described with reference to FIGS. 3 to 6. FIG. 3 shows the outline structure of a mechanical quantity measuring apparatus according to the first embodiment of the present invention. In order to detect a strain quantity of an object being measured by using the mechanical quantity measuring apparatus 1, as shown in FIG. 3 the bonding plane 8 constituting a plane facing the element forming plane of the chip 101 is bonded to an object 1 to be measured, a strain quantity generated in the object 11 being measured is transmitted to the silicon substrate 2 and converted into an electric quantity by the strain sensor 3 on the chip 101. If the bonding plane 8 is directly bonded to the object 11 to be measured, both the silicon substrate and the object to be measured are not processed specifically so that it becomes easy to mount the mechanical quantity measuring apparatus 1 and measure a strain quantity. As a temperature rises in the state that the mechanical quantity measuring apparatus is bonded to the object 11 being measured, a large thermal strain may be generated between the chip 101 and the object 11 being measured. Since the mechanical quantity measuring apparatus 1 is manufactured by semiconductor processes basing upon photolithography techniques, a thin film group including the strain sensor 3 is formed on the upper surface of the silicon substrate. In this invention, the bonding plane 8 is disposed on the bottom surface of the silicon substrate 2. Since an adhesion strength and a breaking strength of the silicon substrate bottom surface side are higher than those of the chip upper surface side made of glass or the like, breaking and peel-off at the bonding plane 8 will not occur and reliable measurement can be made advantageously, even if the temperature of the object 11 being measured rises. The bonding plane 8 has the structure of irregular silicon bottom surface, and the irregular size is 1 μm or larger which is larger than the chip surface irregular size. An anchor effect due to the irregular surface is therefore presented so that adhesion with the object 11 to be measured can be improved further. The strain sensor 3 is made of a diffusion resistor formed by implanting impurities into silicon single crystal. As a strain is applied to the strain sensor, a resistance value changes depending on the piezoresistance effect. A change in an output voltage value caused by the resistance value change is converted into a digital signal via the strain sensor amplifier group 4 and analog/digital convertor 5. This digital signal is converted into a radio wave signal via the communication control unit 7 and rectifier/detector/modem circuit 8, and the radio wave signal is transmitted to the reader from the antenna 9. When a power is supplied through induction electromotive force, a power high frequency signal transmitted from the reader is received at the antenna 9, and smoothed at the rectifier/detector/modem circuit 7 to obtain a d.c. power of a constant voltage which is supplied to each circuit of the mechanical quantity measuring apparatus as a power source.

As the bottom surface of the silicon substrate 2 is used as a bonding surface, a strain quantity to be transmitted from the object being measured to the upper surface of the silicon substrate becomes smaller as a ratio between a thickness of the silicon substrate and a lateral length becomes larger. Namely, since the strain sensor 3 is disposed on the upper surface of the silicon substrate 2, a sensitivity of the mechanical quantity measuring apparatus 1 lowers more greatly as the ratio of a thickness of the silicon substrate to a length in the lateral direction becomes larger. Therefore, the substrate thickness is made thinner relative to the substrate length along the strain measurement direction. A direction indicated by an arrow shown in FIG. 3 is the strain measurement direction. Main sides of the principal surface, along the strain measurement direction of the strain sensor, of the silicon substrate on which the circuits are formed, are set longer than other main sides positioned along the direction crossing the first-mentioned main sides. Alternatively, the strain measurement direction of the strain sensor is disposed along the longitudinal direction of the principal surface of the silicon substrate (the strain measurement direction is nearer to the longitudinal direction than the direction crossing the longitudinal direction).

Alternatively, a ratio between the thickness of the silicon substrate and the length of the semiconductor substrate in the strain measurement direction is 0.3 or smaller, or a ratio between the silicon substrate length along a direction not the strain measurement direction and the silicon substrate thickness is 0.3 or smaller. Specifically, according to the analysis made by the present inventors, it has been clarified that if $t/L_1$ is 0.3 or larger, a strain quantity transmitted to the upper surface of the silicon substrate 2 is 10% or smaller of the strain amount generated in the object 11 being measured, where $L_1$ is the length of the silicon substrate 2 along the strain measurement direction and t is the thickness of the silicon substrate 2. Generally, a range of a strain quantity necessary for strain measurement of a structural body is in the order of $10^{-6}$ to $10^{-1}$, and a sensitivity of the strain sensor made of a silicon diffusion resistor is in the order of $10^{-7}$. Therefore, it is desired that the ratio $t/L_1$ between the thickness t of the chip 101 and the length $L_1$ of the chip 101 along the strain measurement direction is set to 0.3 or smaller. It has been clarified from the analysis results that a strain sensitivity takes a maximum value in the central area of the upper surface of the silicon substrate 2 and reduces in areas nearer to the substrate ends. Therefore, the strain sensor 3 is disposed nearer to the central area of the upper surface of the silicon substrate 2 having a higher sensitivity, than other circuits. For example, the circuits are disposed in the area nearer to the chip end sides than the strain sensor. An area where the antenna is disposed may be set in an area nearer to the substrate end sides than the circuits. In this case, the antenna may be disposed surrounding the strain sensor. In this manner, a mechanical quantity measuring apparatus having a high sensitivity of strain can be provided.

The circuits such as the analog/digital convertor 5, rectifier/detector/modem circuit 6, communication control unit 7 and power supply device 10 are formed on the upper surface of the silicon substrate, and have a possibility of being influenced by strain and lowering a precision of the circuits, similar to the strain sensor 3. For example, an operational amplifier 4 is constituted of a plurality of diffusion resistors, and if influenced by strain, resistance values are changed similar to the case of the strain sensor 3 so that an amplification factor of the operational amplifier 4 may change. Similarly, the circuits such as the analog/digital convertor 5, rectifier/detector/modem circuit 6, communication control unit 7 and power supply device 10 may also be influenced by strain. For strain quantity measurement of high precision and high reliability, it is desired that the circuits other than the strain sensor 3 are not influenced by strain as much as possible. Therefore, the strain sensor 3 for measuring a strain quantity is disposed in the area near to the central area of the upper surface of the silicon substrate 2 having a highest sensitivity, whereas the circuits other than the strain sensor 3 for which circuits the strain influence is excluded as much as possible are disposed in the area near the upper surface side ends of the chip. Particularly if the operational amplifier 4 which is an analog circuit and made of impurity diffusion regions is influenced by strain, its output is influenced greatly. Further, since an output of the strain sensor 3 is amplified immediately by the operational amplifier 4, the operational amplifier 3 is disposed adjacent to the strain sensor 3 disposed in the area near the central area of the upper surface of the silicon substrate 2. The circuits other than the sensor are preferably disposed in the area outer than the sensor, and at least in the area nearer to the side edges of the upper surface of the silicon substrate 2 than the strain sensor 3. In this manner, a mechanical quantity measuring apparatus of high reliability can be provided. The strain sensor 3 is not necessarily required to be disposed correctly in the upper surface central area of the silicon substrate 2, but it is sufficient if the strain sensor is disposed in the area nearer to the central area of the upper surface of the silicon substrate 2 than the circuits such as the analog/digital convertor 5, rectifier/detector/modem circuit 6, communication control unit 7 and power supply device 10. The circuits such as the analog/digital convertor 5, rectifier/detector/modem circuit 6, communication control unit 7 and power supply device 10 are not necessarily required to be disposed in contact with the side ends of the upper surface of the chip 101, but it is sufficient if the circuits are disposed in the area nearer to the side ends than the strain sensor 3.

In measuring a strain quantity, strain components along a particular direction are often measured. If there are strains in a plurality of different directions in the object 11 being measured, an output of the strain sensor 3 contains the influence of strains in a plurality of different directions. In order to measure a strain quantity along one particular limited direction, a mechanical quantity measuring apparatus is required which has a strain sensitivity in a particular direction. As described earlier, as the bonding plane 8 having the plane facing the element forming plane of the chip 101 is bonded to the object to be measured, the sensitivity of the strain sensor 3 is greatly influenced by the ratio between the length and thickness of the silicon substrate. As shown in FIG. 3, the ratio $t/L_1$ between the thickness and length of the silicon substrate 2 along the strain quantity measurement direction is set to 0.3 or smaller, and the ratio $t/L_2$ along the direction perpendicular to the strain quantity measurement direction is set to 0.3 or larger. It is therefore possible to provide a mechanical quantity measuring apparatus having a sensitivity along a particular direction for strain measurement target. Also in this case, the circuits such as the operational amplifier unit 4, analog/digital convertor 5, rectifier/detector/modem circuit 6, and communication control unit 7 are disposed in the area nearer to the upper surface side ends of the silicon substrate 2 not susceptible to strain influence so that high precision and high reliability measurement is possible limiting the strain measurement direction to a particular direction.

The strain sensor and the circuits such as the analog/digital convertor 5, rectifier/detector/modem circuit 6, communication control unit 7 and power supply device 10 are used being optically exposed on the upper surface of the chip 101. Namely, being different from a general semiconductor device, since strain measurement is made by bonding the bottom surface of the chip 101 to the object to be measured, the circuit surface is exposed externally. In this case, as the circuits are exposed to light, an electron mobility increases resulting in an observation problem of an apparent change in strain.

Figure 4:
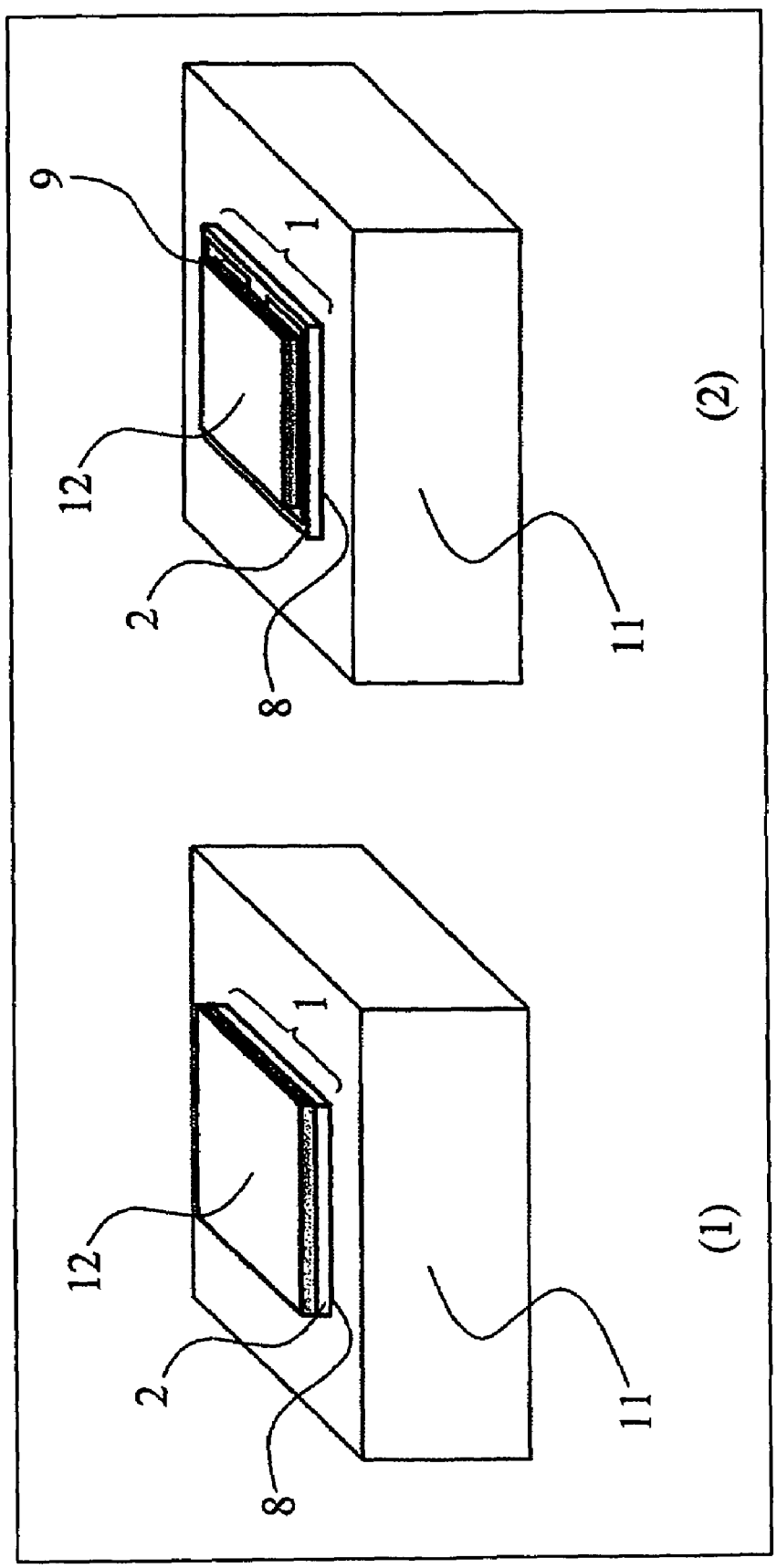
FIG. 4 is a diagram showing the structure of the mechanical quantity measuring apparatus according to the first embodiment of the present invention.

To avoid this, as shown in FIG. 4, a light shielding protective member 12 is disposed on the upper surface of the chip 101 formed with the circuits. The mobility of electrons moving in the impurity diffusion layers forming the circuits such as the strain sensor 3 changes greatly by the influence of light, so that a correct output of a strain quantity actually generated cannot be obtained if light is applied. As the impurity diffusion layers are light-shielded by the light shielding protective member 12, it is possible to remove a change in the electron mobility to be caused by the influence of light upon the strain sensor 3 and perform strain measurement of high precision and high reliability. In this case, it is effective if the light shielding protective member 12 has the effect of shielding light having an energy of 1.1 eV or higher corresponding to the band gap of silicon. Namely, it is desirous if the protective member shields light in the near infrared range to ultraviolet range. This protective member 12 may be disposed as shown in FIG. 4(2) by not covering the antenna 9. There is a resin film covering the circuits formed on the substrate, and the ends of the resin film are positioned at the area where the antenna 9 is formed. In this case, there is no substance between the antenna 9 and reader, radio wave transmission becomes easy and a communication precision is improved. By disposing the light shielding protective member such as resin on the upper surface of the silicon substrate 2, the circuits can be protected from an external impact, corrosion and the like and a strength reliability can advantageously be retained.

Figure 5:
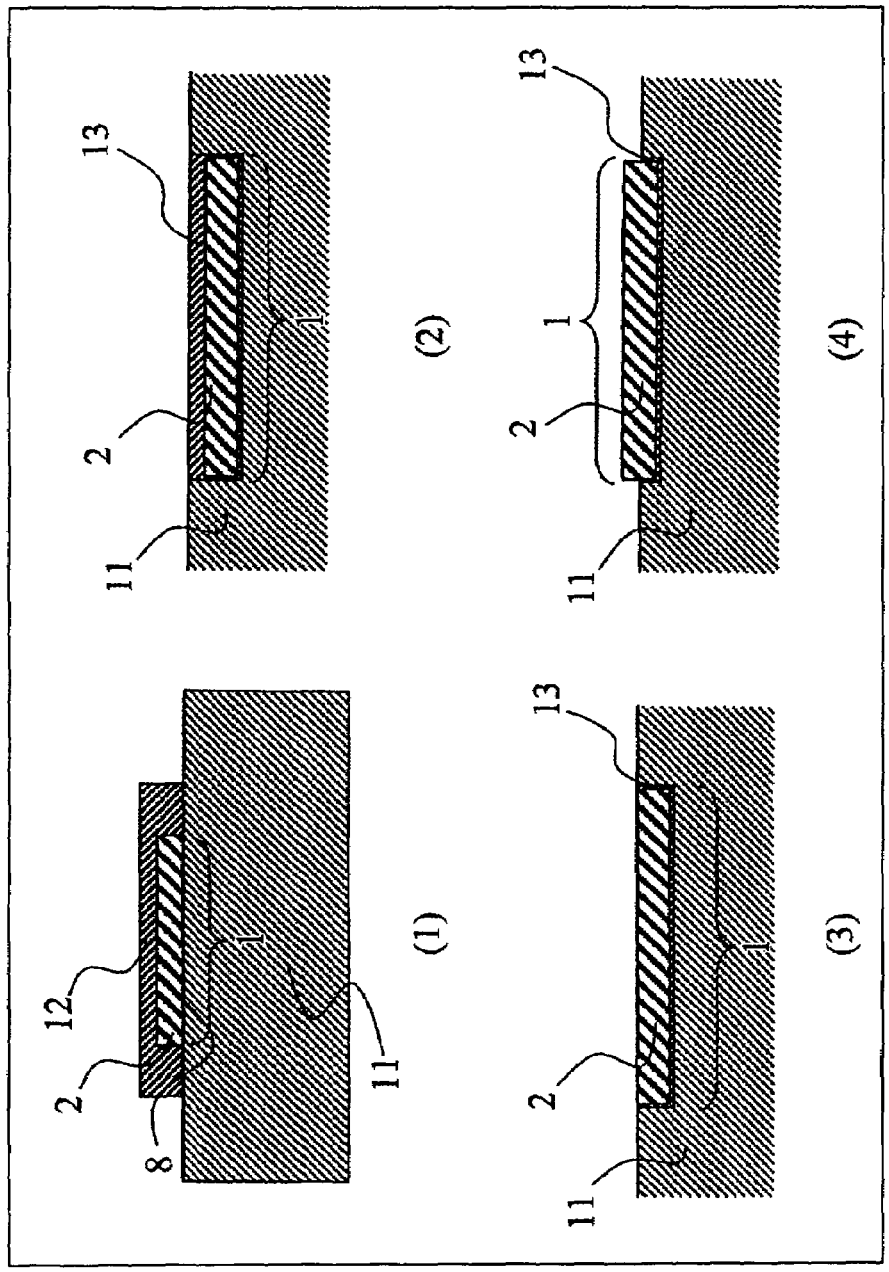
FIG. 5 is a diagram showing the structure of the mechanical quantity measuring apparatus according to the first embodiment of the present invention.

As shown in FIG. 5(1), a cover member covering the silicon substrate is formed in such a manner that a portion of the cover member is coupled to the sides of the semiconductor substrate and another portion is coupled to the object to be measured. A protective member 13 may be used as the cover member in this example. The protective member 13 is not necessarily required to cover the whole of the silicon substrate. The protective member 13 may cover the whole of the chip 101 including its sides. It is preferable that the protective member 13 contacts the chip 101 on one hand and the object to be measured on the other hand. In this case, since the side direction of the chip 101 is restricted by the resin 13, a response to strain generated in the object 11 being measured becomes good and the precision is improved.

In order to mount the mechanical quantity measuring apparatus 1 on the object to be measured and measure at high precision a strain quantity in the object being measured, it is desired to use a mounting method which improves the strain response of the chip 101 relative to the strain quantity in the object being measured. Namely, it is required that the silicon substrate 2 constituting the mechanical quantity measuring apparatus 1 deforms following at good precision the strain quantity in the object being measured.

To this end, as shown in FIG. 5(2), the mechanical quantity measuring apparatus 1 is directly buried in the object 11 to be measured, by using a bonding/fixing intermediate member 13. The chip 101 mounted in the object to be measured is disposed in such a manner that the sides of the silicon substrate have the area positioned facing a portion of the object to be measured. As the mechanical quantity measuring apparatus 1 can exchange strain quantity information with the reader in a wireless way, measurement is not hindered even if the apparatus is buried. As shown in FIG. 5(2), if the mechanical quantity measuring apparatus 1 is directly buried in the object 11 to be measured, not only the bonding plane 8 but also the sides and upper surfaces of the chip 101 are restricted at the same time. Therefore, a strain response of the chip 101 relative to the strain quantity in the object 11 being measured is improved and the measurement sensitivity is improved. If resin is used as the material of the bonding/fixing intermediate member, a Young's modulus of resin is about 10 to 20 GPa, a Young's modulus of the silicon substrate 1 of the chip 101 is about one hundred and several tens GPa, and a Young's modulus of the object 11 of, e.g., iron-containing metal to be measured is about 200 GPa. Therefore, strain is relaxed in the resin and the sensitivity is lowered. A reduction in the sensitivity can be suppressed if a gap between the chip and the object to be measured is as small as possible, and it is desirous that the gap is 1 mm or narrower.

As shown in FIG. 5(3), for strain measurement, the mechanical quantity measuring apparatus 1 may be buried exposing the upper surface thereof to the external or may be buried by using a bonding/fixing intermediate member and exposing the antenna on the upper surface of the silicon substrate. Alternatively, as shown in FIG. 5(4), a portion of the mechanical quantity measuring apparatus 1 may be buried. The silicon substrate is mounted in a recess of the object to be measured, and at least a portion of the side walls of the substrate is positioned facing the side wall of the recess. Alternatively, the mechanical quantity measuring apparatus may be disposed in such a manner that the upper surface of the silicon substrate is higher than the surface of the object to be measured surrounding the area where the silicon substrate is mounted, and that the bottom surface of the silicon substrate is lower than the surface of the object to be measured.

Even in this structure, since the sides of the chip 101 are restricted, a higher strain sensitivity can be obtained than that when only the bonding plane 8 is bonded. As the chip upper surface is exposed, the antenna 9 is exposed to the external and there is no radio wave obstruction so that the measurement precision is improved. Since a radio wave arrival distance is prolonged, strain quantity measurement is possible even if the mechanical quantity measuring apparatus 1 is installed at a site remote from the reader. If only the upper surface of the mechanical quantity measuring apparatus 1 is exposed to the external as shown in FIG. 5(3), the surface shape of the object to be measured does not change from the state before burying the mechanical quantity measuring apparatus. For example, if the object to be measured is a rotary member whose surface is subjected to friction, a rotation motion will not be hindered.

If a portion of the mechanical quantity measuring apparatus 1 is buried as shown in FIG. 5(4), when the bonding/fixing intermediate member is inserted into the peripheral area of the mechanical quantity measuring apparatus, the member will not flow on the upper surface of the mechanical quantity measuring apparatus 1 and will not cover the antenna 9 disposed on the upper surface of the mechanical quantity measuring apparatus 1, allowing stable communications.

Figure 6:
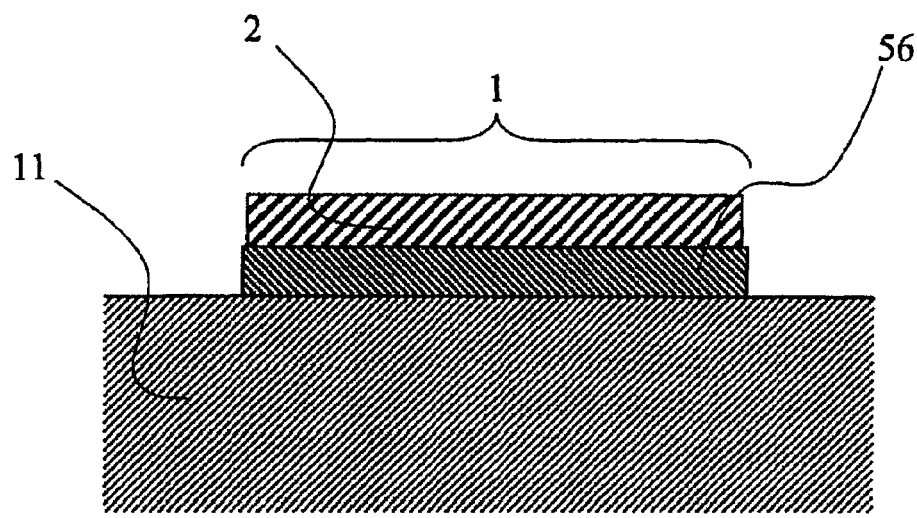
FIG. 6 is a diagram illustrating an installing method for the mechanical quantity measuring apparatus according to the first embodiment of the present invention.

The silicon substrate 2 constituting the chip 101 is made of silicon single crystal. A breaking strength of silicon single crystal is about 400 GPa at a maximum. Considering a Young's modulus of 130 to 160 GPa of silicon single crystal, silicon single crystal is broken at a strain of about 2.5 to $3.0 \times 10^{-2}$. However, in general strain measurement, a measurement range of about $10^{-1}$ is requested in some cases, which is over a critical strain quantity of the silicon substrate 2 by one digit. In this case, as shown in FIG. 6 a resin stress relaxation layer 56 having a Young's modulus lower than that of silicon single crystal is formed between the chip 101 and the object 11 to be measured. With this arrangement, strain applied to the silicon substrate 2 can be reduced. If an attenuation amount of a strain quantity is measured beforehand when the stress relaxing layer 56 is used, it is possible to perform strain measurement in a broader range than the breaking critical strain quantity of silicon single crystal. It is desirous to use the resin layer 56 having a Young's modulus larger by one digit than that of the silicon substrate.

Figure 7:
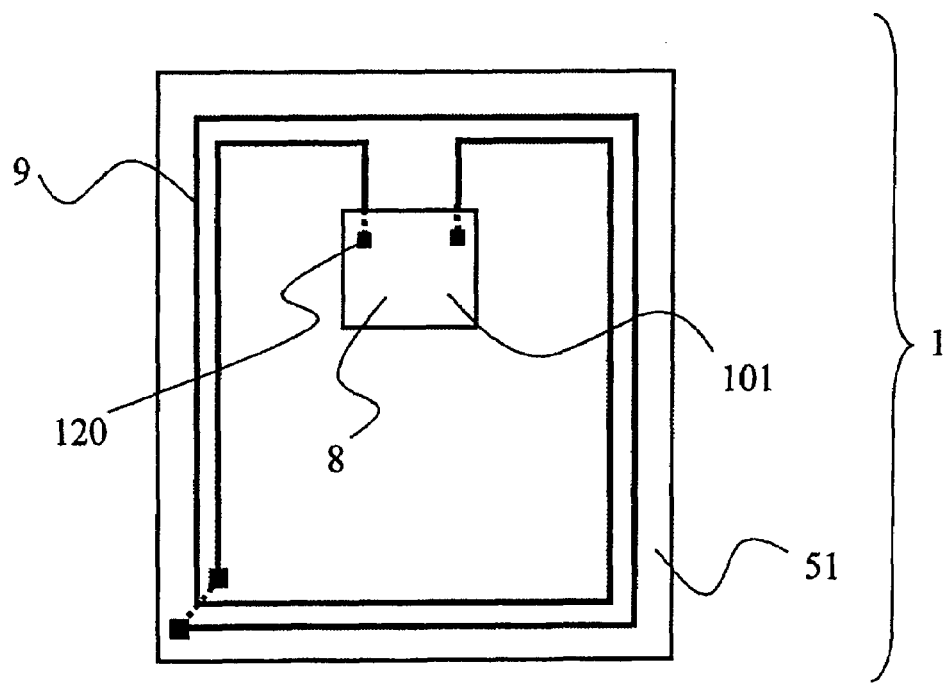
FIG. 7 is a diagram showing the structure of a mechanical quantity measuring apparatus according to a second embodiment of the present invention.

The second embodiment of the present invention will be described with reference to FIGS. 7 to 11. In the first embodiment, the antenna 9 is disposed on the chip 101. The antenna 9 may be mounted outside the chip 101 as described earlier. As shown in FIG. 7, a mechanical quantity measuring apparatus comprises a resin tape 51, a layer of an antenna 9 formed on the resin tape 51, and a silicon substrate chip 101 disposed on the resin tape 51. Formed on a principal surface of the chip 101 are at least a strain sensor, an amplifier/convertor circuit for amplifying a signal from the strain sensor and converting it into a digital signal, a transmission circuit for transmitting the converted digital signal to the external of the semiconductor substrate, and a power source circuit. The transmission circuit is electrically connected to the antenna 9. As shown in FIG. 7, it is preferable that the outer periphery of the silicon substrate chip 101 is surrounded by the antenna 9. Pads 120 formed on the resin tape are used for bonding the antenna.

Figure 8:
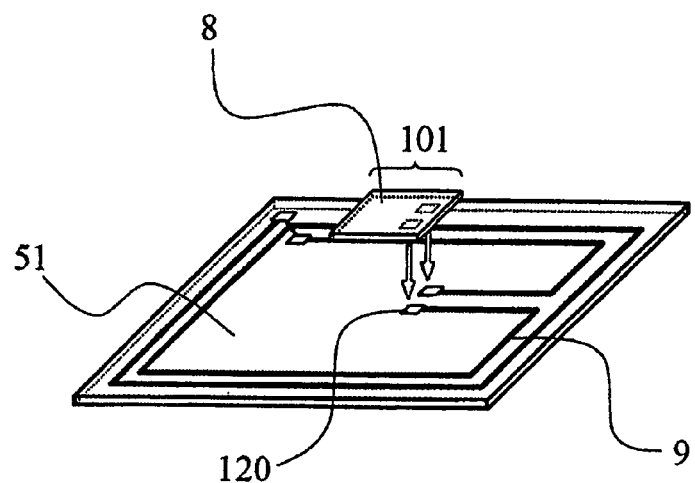
FIG. 8 is a diagram showing the structure of a mechanical quantity measuring apparatus according to the second embodiment of the present invention.

More specifically, as shown in FIG. 7 the chip 101 is disposed on the resin tape 51 of polyimide or the like, and the portion corresponding to the antenna layer and pads 120 is formed on the resin tape 51. The antenna is disposed surrounding the periphery of the chip 101. Since the area occupied by the antenna 9 in the mechanical quantity measuring apparatus 1 can be utilized, a sufficient power quantity can be supplied to the chip 101 and high precision measurement is possible. For the high precision measurement, it is desirous that the chip 101 is directly mounted on an object to be measured. To this end, as shown in FIG. 8, the pads 120 to be connected to the antenna 9 are formed on the upper surface where the circuits of the chip 101 are formed and directly connected to the antenna 9, and the mechanical quantity measuring apparatus is bonded to the object to be measured by using the lower surface of the chip 101, i.e., the bonding plane 8. Since the bonding plane 8 at the bottom of the chip 101 can be bonded directly to the object to be measured, strain measurement can be made at high precision.

Figure 9:
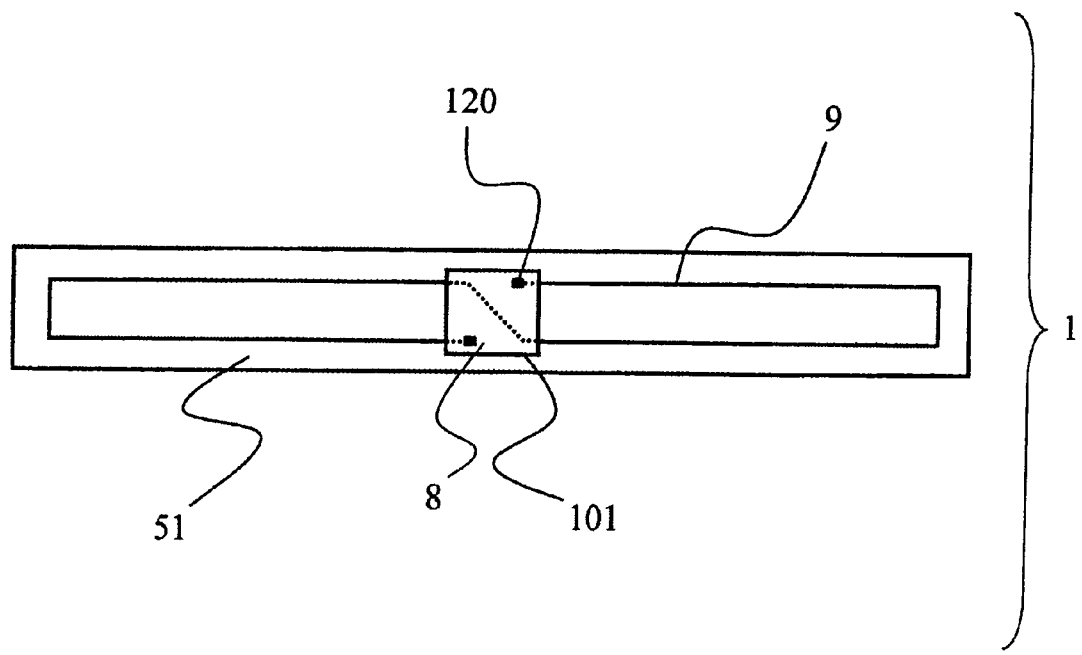
FIG. 9 is a diagram showing the structure of a mechanical quantity measuring apparatus according to the second embodiment of the present invention.

As shown in FIG. 9, a chip 101 may be disposed on a rod-like resin tape 52 and an antenna 9 may be disposed extending on both sides or one side of the resin tape 52. In this case, since the area occupied by the mechanical quantity measuring apparatus 1 can be made small, strain measurement by the mechanical quantity measuring apparatus 1 is possible even in an area where a strain change occurs in a narrow area, such as in a local strain concentration field.

Strain measurement is made by mounting the mechanical quantity measuring apparatus 1 on the object to be measured. If the object to be measured is made of metal, a progression direction of electromagnetic waves supplied from the reader 201 to the mechanical quantity measuring apparatus 1 is bent in a direction horizontal to the metal surface, near at the metal surface due to the influence of metal. It becomes difficult for the electromagnetic waves to reach the antenna 9 and a sufficient power amount cannot be supplied to the mechanical quantity measuring apparatus 1.

Figure 10:
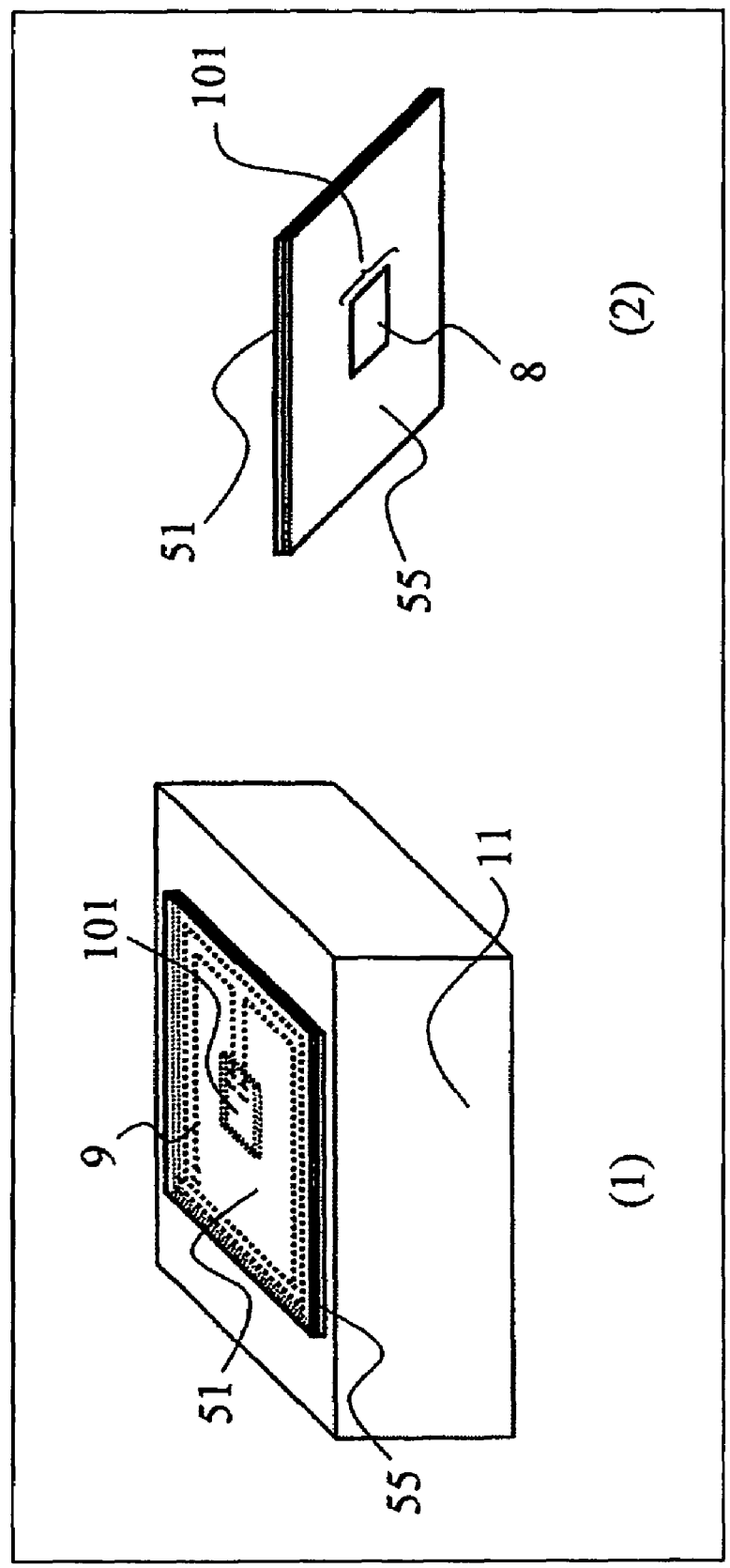
FIG. 10 is a diagram showing the structure of a mechanical quantity measuring apparatus according to the second embodiment of the present invention.

To avoid this, as shown in FIG. 10, a high permeability sheet 55 is interposed between the antenna 9 and the object 11 to be measured. The high permeability sheet 55 has a higher permeability than that of the object (metal) to be measured. Since the high permeability sheet 55 is formed on the antenna 9 on the side of the object 11 to be measured, electromagnetic waves from the reader 201 become easy to reach the antenna 9. Therefore, even if the object 11 to be measured is made of metal, a sufficient power quantity can be supplied to the chip 101 and strain measurement can be made with stable high reliability. Since it is desirous that the chip 101 is directly mounted on the object 11 to be measured in order to perform high precision strain measurement, as shown in FIG. 10(2) it is preferable to dispose the high permeability sheet 55 in the area excluding the chip 101. It is therefore desirous to form an opening through the sheet in an area corresponding to the chip 101.

Figure 11:
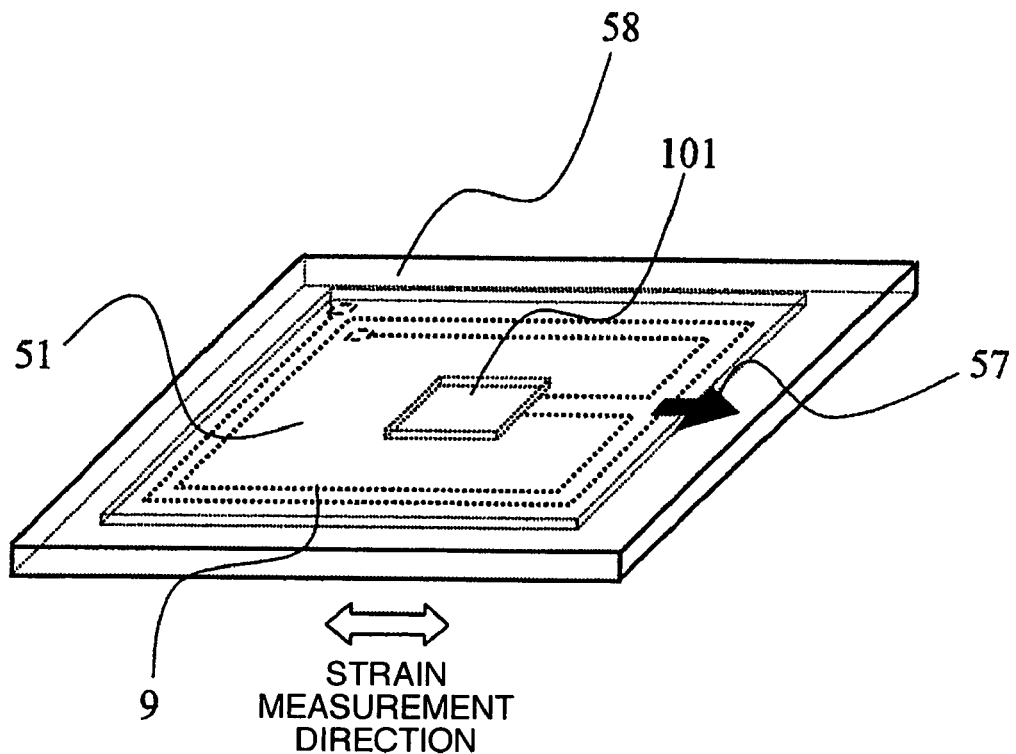
FIG. 11 is a diagram showing the structure of a mechanical quantity measuring apparatus according to the second embodiment of the present invention.

Since a number of metal wirings and antenna exist in the mechanical quantity measuring apparatus 1, there arises a corrosion problem in the inferior environment such as a high temperature and high humidity environment. To solve this problem, if the chip 101 is disposed on the resin tape 51 of polyimide or the like and the antenna 9 is disposed surrounding the periphery of the chip, as shown in FIG. 11 resin 58 having a higher rigidity than that of the resin tape 51 covers the silicon chip 101 and resin tape 51. It is also possible to use the arrangement that at least a portion of the resin tape 51 is covered.

More specifically, as shown in FIG. 11, the entirety of the mechanical quantity measuring apparatus 1 is covered like a card with resin 58 such as polyethylene terephthalate. The resin 58 has a higher rigidity than that of the resin tape 51. A symbol 57 indicating a strain measurement direction is preferably drawn on the card. By covering the entirety of the mechanical quantity measuring apparatus 1 with the resin 58 like a card, a corrosion resistance can be improved. The resin 58 will not obstruct radio waves transmitted from the reader 201 to the antenna 9 and is superior in adhesion to the silicon substrate 2. Therefore, even if the mechanical quantity measuring apparatus is bonded to the object to be measured, the apparatus is hard to be peeled off and high reliability strain measurement is possible. Further, since the sides of the chip 101 are covered with the resin 58 and restricted, high precision strain measurement is possible. Furthermore, if the resin 58 is made of light shielding material, the influence of light upon the strain sensor 8 can be suppressed. Since the resin having a low Young's modulus is intervened between the chip 101 and object 11 to be measured, a strain quantity applied to the silicon substrate 2 can be reduced. It is therefore possible to measure a strain amount in a broad range and with high reliability.

Figure 12:
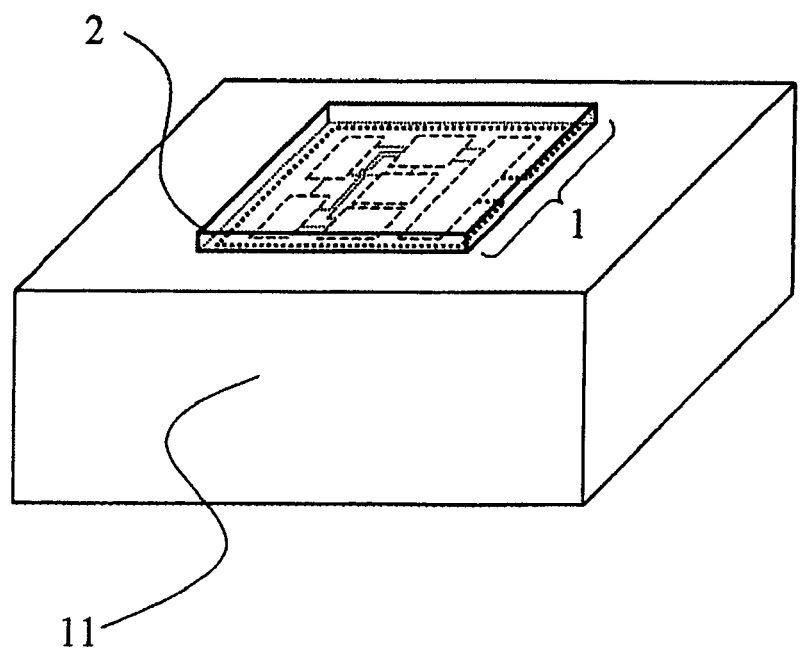
FIG. 12 is a diagram illustrating an installing method for a mechanical quantity measuring apparatus according to a third embodiment of the present invention.

The third embodiment of the present invention will be described with reference to FIG. 12. In order to measure a strain at higher precision, it is desirous that the strain sensor 3 is disposed at a position where the influence of strain is more likely to be received. In FIG. 12, an object to be measured has an area where the principal surface formed with the strain sensor is disposed. More specifically, as shown in FIG. 12 the chip is turned upside down to direct the thin film group under the chip, and mounted on an object 11 to be measured. In the mechanical quantity measuring apparatus 1 of the present invention, since strain information obtained by the strain sensor 3 is transmitted to an external reader wirelessly, strain measurement is possible even if the chip turned upside down is mounted. As described earlier, as the chip 101 is bonded to the object 11 to be measured, a strain quantity transmitted from the object 11 being measured to the silicon substrate 2 is larger at a position nearer to the bonding interface. Therefore, as the chip 101 turned upside down is bonded to dispose the sensor 3 nearer to the object 11 to be measured, the strain sensor 3 is disposed in the area where a strain sensitivity is large so that it is advantageous in that a measurement sensitivity increases. Further, only the silicon substrate is exposed to the external so that it is possible to suppress the influence of light upon the circuits such as the analog/digital converter 5, rectifier/detector/modem circuit 6 and communication control unit 7. Furthermore, since the silicon substrate is made of silicon single crystal, even if the mechanical quantity measuring apparatus 1 is used in a corrosion environment, various factors of lowering the strength of grain boundary corrosion and the like can be excluded and very high strength reliability can be retained. As the chip 101 is disposed in an upside down state, the periphery of the bonding plane is surrounded by a free surface so that a strain sensitivity is low at the bonding plane side ends and increases toward the central area. Therefore, the strain sensor 3 is disposed in the area nearer to the central area as much as possible, and the circuits such as the analog/digital converter 5, rectifier/detector/modem circuit 6, communication control unit 7 and power supply device 10 are disposed in the area nearer to the bonding plane side ends. In this manner, it becomes possible to provide a mechanical quantity measuring apparatus having a high sensitivity and high reliability.

Figure 13:
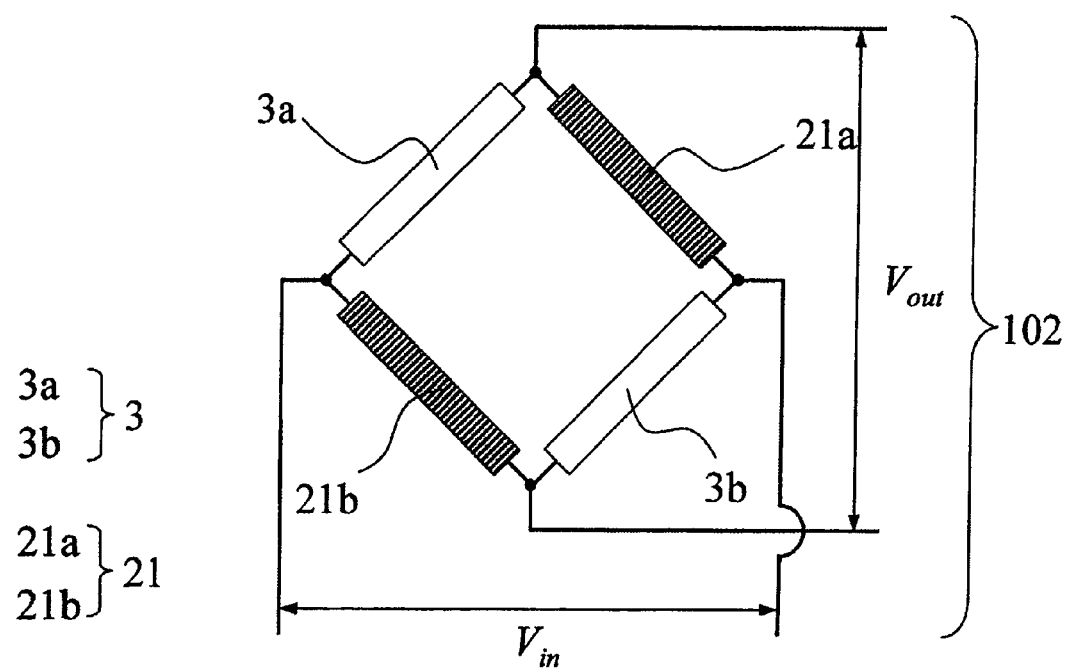
FIG. 13 is a diagram showing the outline of a Wheatstone bridge circuit according to a fourth embodiment of the present invention.

The fourth embodiment of the present invention will be described with reference to FIGS. 13 to 19. A mechanical quantity measuring apparatus of the fourth embodiment has fundamentally the structure and characteristics similar to those of the first embodiment, and in addition a Wheatstone bridge circuit 102 constituted of resistor layers of strain sensors 3 and resistor layers of dummy resistors 21 is formed in the same single crystal silicon substrate 2. FIG. 13 is a circuit diagram of the Wheatstone bridge circuit of this embodiment. In FIG. 13, although the Wheatstone bridge 102 has two strain sensors 3 and two dummy resistors 21, a one active gauge type Wheatstone bridge circuit may be used which has one strain sensor and three dummy resistors. In FIG. 13, the two strain sensors $3a$ and $3b$ and two dummy resistors $21a$ and $21b$ are connected starting from the strain sensor $3a$, dummy resistor $21a$, strain sensor $3b$ and to dummy resistor $21b$ in this order in a clockwise direction, to constitute the Wheatstone bridge circuit. An input voltage is applied across a connection between the dummy resistor $21a$ and strain sensor $3b$ and a connection between the dummy resistor $21b$ and strain sensor $3a$. An output voltage is detected across a connection between the strain sensor $3a$ and dummy resistor $21a$ and a connection between the strain sensor $3b$ and dummy resistor $21b$.

Although the dummy resistors 21 may have a strain sensitivity similar to the strain sensors 3, the sensitivity of the dummy resistors should by smaller than that of the strain sensors 3 or the dummy resistors should generate a resistance change having an opposite sign to that of the outputs of the strain sensors 3.

Since a resistance change quantity of the strain sensors 3 is very small, if an output signal is amplified directly, the signal processing at subsequent stages becomes complicated. Therefore, generally, the Wheatstone bridge circuit 102 is formed, and an output voltage proportional to the resistance change quantity of the strain sensors 3 is amplified to use the value proportional to the strain. If the temperature state of the resistance values of the dummy resistors 21 is set to the same temperature state as that of the strain sensors 3, the Wheatstone bridge circuit 102 functions advantageously as a temperature compensation circuit.

The mechanical quantity measuring apparatus has the circuits formed on the single crystal silicon substrate 2, and the bottom surface of the silicon substrate is used as the bonding plane 8 to be bonded to the object to be measured. Therefore, the circuits other than the strain sensors 3 are susceptible to the strain influence so that there is a fear that the dummy resistors 21 have a resistance change to the same extent as that of the strain sensors 3.

Figure 14:
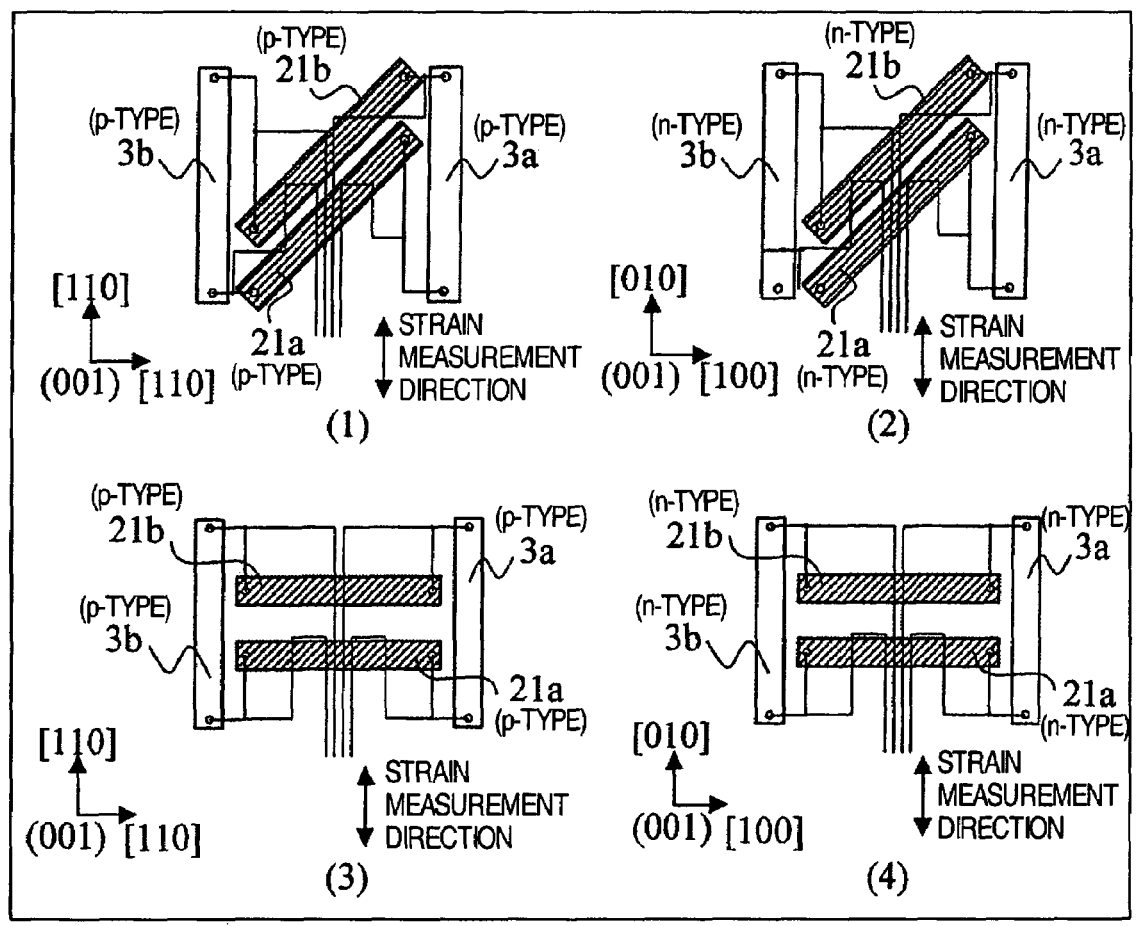
FIG. 14 is a diagram showing layout directions of diffusion layers according to the fourth embodiment of the present invention.

FIG. 14(1) shows one example of the layout of the Wheatstone bridge circuit 102 of this embodiment capable of solving this problem. In the description of the embodiment, crystallographically equivalent directions such as [110] and [−110] are collectively described as <110>. The strain sensors $3a$ and $3b$ of the Wheatstone bridge circuit 102 are formed by locally forming p-type impurity layers by diffusion in the silicon substrate 2, the longitudinal direction of the strain sensors being the <110> direction. Similarly, the dummy resistors 21 are formed by locally forming p-type impurity layers by diffusion in the silicon substrate, the longitudinal direction of the straight dummy resistors being the <100> direction. It is desirous that the resistance values of the strain sensors 3 and dummy resistors 21 are almost equal in the non-strain state. As the strain sensors 3 are made of p-type impurity diffusion layers and the longitudinal direction is set to the <110> direction, it is advantageous in that the stress sensitivity in the longitudinal direction can be made large. As the dummy resistors 21 are made of p-type impurity diffusion layers and the longitudinal direction is set to the <100> direction, a sensitivity of a vertical stress can be minimized. Since both the strain sensors and dummy resistors can be made of the same p-type impurity layers, both the strain sensors and dummy resistors can be made at the same time, for example, by using the same mask or by the same process. It is therefore advantageous in that the resistance values can be set approximately the same. For example, as the p-type impurity ion implantation process is executed to form impurity layers of the strain sensors and dummy resistors, approximately the same sheet resistance value is obtained for both the strain sensors 3 and dummy resistors 21. It is therefore possible to lower an offset quantity of an output of the Wheatstone bridge circuit. In this case, in order to raise a precision of an impurity dose and form a diffusion profile with good reproductivity, it is desirous that the impurity diffusion process is executed by ion implantation and a succeeding activation process. Since the strain sensors and dummy resistors can be formed on one chip at the same time by using the same p-type impurity layers, a variation in the concentration distributions of the diffusion layers can be suppressed. It is therefore advantageous in that the same sheet resistance value and the same temperature dependency of the resistance values can be made. In the above description, although the strain sensors are formed along the <110> direction and the dummy resistors are formed along the <100> direction, this is an ideal state. Even if an angle shift occurs due to manufacture processes, the advantages of this embodiment can be obtained sufficiently. Namely, the advantages can be obtained by disposing the strain sensors along a direction near not the <100> direction but the <110> direction, and the dummy resistors along a direction near not the <110> direction but the <100> direction.

As shown in FIG. 14(2), strain sensors 3 and dummy resistors 21 can be formed on the same substrate even if n-type diffusion resistor layers are used. The strain sensors 3 are formed by locally forming p-type impurity layers by diffusion in the silicon substrate, the longitudinal direction of the strain sensors being the <100> direction. Similarly, the dummy resistors 21 are formed by locally forming p-type impurity layers by diffusion in the silicon substrate, the longitudinal direction of the straight dummy resistors being the <110> direction. The resistance values of the strain sensors 3 and dummy resistors 21 are almost equal. As the strain sensors 3 are made of n-type impurity diffusion layers and the longitudinal direction is set to the <100> direction, it is advantageous in that the stress sensitivity in the longitudinal direction can be made large. As the dummy resistors 21 are made of n-type impurity diffusion layers and the longitudinal direction is set to the <110> direction, a sensitivity of a vertical stress can be minimized. Similar to the p-type diffusion layers, the Wheatstone bridge circuit made of the n-type impurity diffusion layers manufactured as above is advantageous in that the resistance values are made approximately the same, the offset quantity of an output can be minimized, and the temperature dependency of the offset quantity can be made approximately the same. As compared to the p-type impurity diffusion layers, the Wheatstone bridge circuit made of the n-type impurity diffusion layers has the advantage that a sensitivity of the strain sensors 3 is high, although it has the disadvantage that a stress sensitivity along the normal direction relative to the chip upper surface of the dummy resistors is large. In the above description, although the strain sensors are formed along the <100> direction and the dummy resistors are formed along the <110> direction, this is an ideal state. Even if an angle shift occurs due to manufacture processes, the advantages of this embodiment can be obtained sufficiently. Namely, the advantages can be obtained by disposing the strain sensors along a direction near not the <110> direction but the <100> direction, and the dummy resistors along a direction near not the <100> direction but the <110> direction.

If the design is not to make the impurity concentrations of the strain sensors and dummy resistors be coincident, there is a possibility that temperature compensation of the offset quantity has a slight error, and it is further anticipated that deviations of resistance values of the strain sensors 3 and dummy resistors 21 have a variation. However, other advantages can be obtained in a similar manner.

If a strain generation direction is a uniaxial particular direction and strain along this direction is to be measured, as shown FIGS. 14(3) and 14(4) the strain sensors 3 are disposed along the strain measurement direction, and the dummy resistors 21 are disposed to have a longitudinal direction so that current flows along a direction perpendicular to the strain measurement direction. When the p-type diffusion layers are used, the strain sensors 3 and dummy resistors are disposed perpendicular to each other along the <110> direction. When the n-type diffusion layers are used, the strain sensors 3 and dummy resistors are disposed perpendicular to each other along the <100> direction. As these diffusion layers are disposed on a silicon single crystal substrate, the dummy resistors 21 disposed perpendicular to the strain sensors 3 disposed in parallel have the characteristics that there is a change in the resistance value having an opposite sign to that of the strain sensors. Therefore, an output quantity of the bridge circuit increases, and a large output can be obtained even from a small strain quantity so that strain measurement at high precision is possible.

Description will be made on the sequence of forming diffusion layer of the bridge.

The Wheatstone bridge formed on the silicon substrate 2 by using p-type diffusion resistors is constituted of, as shown in FIG. 14(1), two strain sensors 3a and 3b having the longitudinal direction parallel to the <110> direction and two dummy resistors 21a and 21b having the longitudinal direction parallel to the <100> direction. It is desirous that the resistance values of four resistors of the Wheatstone bridge circuit are ideally quite the same in a non-strain state. If the resistance values of the four resistors are equal, as a voltage is applied to Vin shown in FIG. 13, the voltage drops at the resistor 3a and resistor 21b and at the resistor 3b and resistor 21a are equal so that a voltage difference at Vout is not generated, an output is 0 and the amplification process at the later stage can be facilitated. However, even if the resistor values are designed to be the same, when the diffusion layers are formed actually on a silicon substrate, there is an influence of a variation in gas concentration of impurity atoms and the like so that the resistance values of the resistors are different.

In order to avoid a change in resistance values caused by a variation in gas concentrations as much as possible, as shown in the example of FIG. 14(1), it is desirous that four resistors are disposed in areas as near as possible. Namely, it is desirous that a resistor constituting the Wheatstone bridge is disposed at a distance shorter than the size such as length and width of an adjacent resistor. In order to set the offset of an output voltage Vout in the non-strain state to 0 even if the resistance values of all four resistors are not coincident, at least the ratio of four resistance values R is set to $R_{21a}$:$R_{3b}$=$R_{3a}$:$R_{21b}$. It is generally considered that a variation in gas concentrations has a certain inclination in the silicon substrate in-plane. For example, as shown in FIG. 14(1), the resistors 3a and 21a are disposed near each other and the resistors 21b and 3b are disposed near each other to dispose the resistors in the order of resistor 3a→resistor 21a→resistor 21b<resistor 3b so that the ratio of the four resistance values can be set near to $R_{21a}$:$R_{3b}$=$R_{3a}$:$R_{21b}$. A ratio of an adjacent pair of resistors is set smaller than a ratio of an opposing pair of resistors. In this manner, a Wheatstone bridge circuit can be realized which can set an output in the non-strain state to approximately 0. This layout is not limited to p-type diffusion resistors shown in FIG. 14(1), but may be applied to different shapes and directions of the diffusion resistors or to n-type diffusion resistors, with similar expected advantages. This layout is not limited only to the Wheatstone bridge made of diffusion layers of silicon single crystal. For example, this layout is applicable to a Wheatstone bridge made of polysilicon thin films or metal thin films, with similar expected advantages.

When four diffusion resistors constituting the Wheatstone bridge circuit 102 are formed and in order to make the resistance values of all diffusion resistors be equal, it is desirous that the environment of the peripheral area of each diffusion resistor is the same. As shown in FIGS. 14(1) to 14(4), the Wheatstone bridge circuit of the present invention is characterized in that resistors disposed along different directions are formed as near as possible. Therefore, the peripheral circumstances of four diffusion resistors are different. In this case, when the shapes of resistors of diffusion layers are formed by etching a mask, there is a possibility that this etching makes irregular the gas concentration distribution above the diffusion resistors and the diffusion quantity of resistors is varied.

Figure 15:
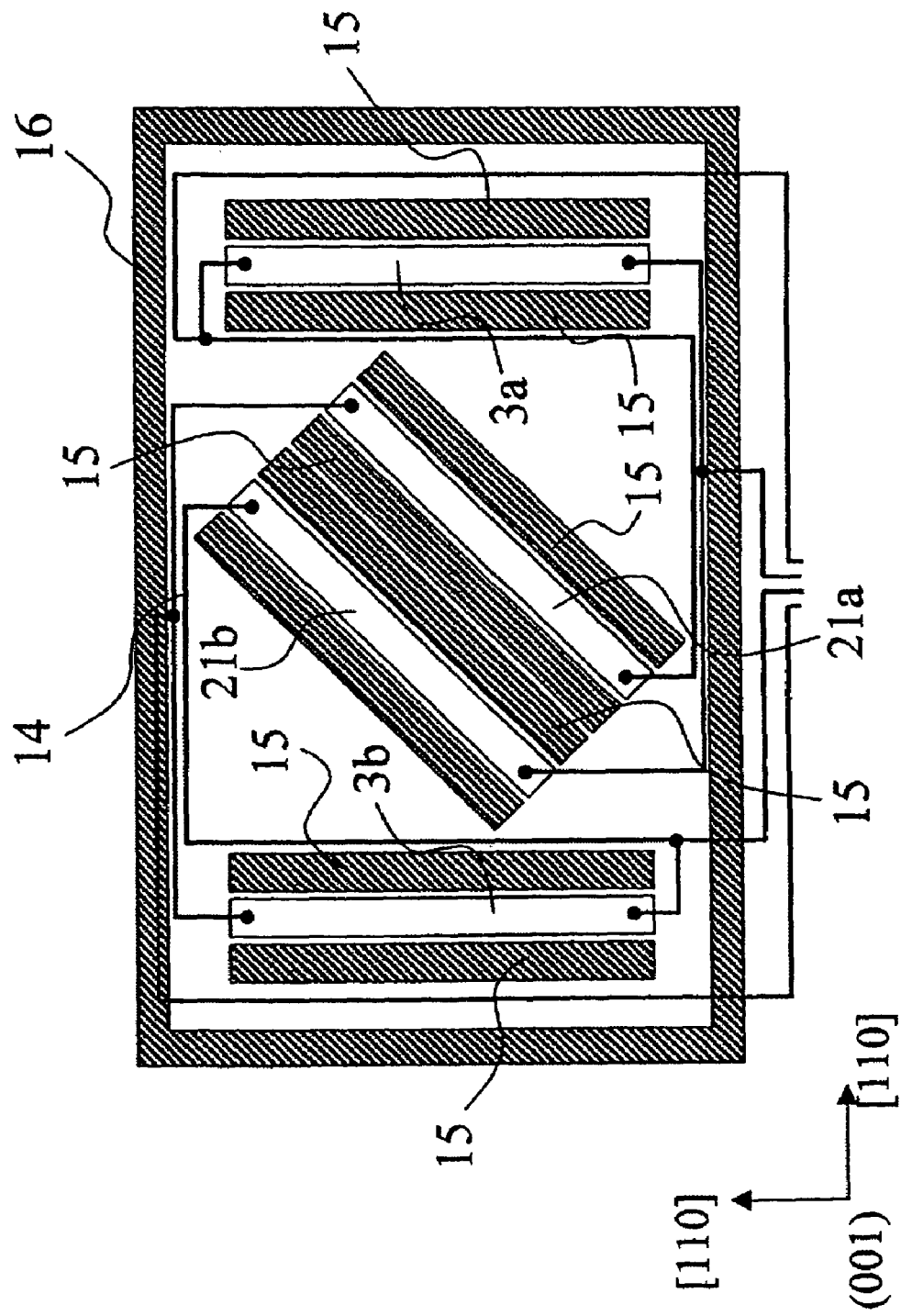
FIG. 15 is a diagram showing the layout of diffusion layers according to the fourth embodiment of the present invention.

A mechanical quantity measuring apparatus shown in the example of FIG. 15 comprises a Wheatstone bridge circuit having a plurality of resistor layers including strain sensor resistors 3a and 3b and dummy resistors 21a and 21b, a convertor circuit for converting a signal from the Wheatstone bridge circuit into a digital signal, a transmission circuit for transmitting the digital signal to the external of the semiconductor substrate, and a power source circuit, respectively formed on a circuit forming surface of a silicon chip 101. The mechanical quantity measuring apparatus comprises also dummy diffusion layers 15 which are formed along the longitudinal direction of the strain sensor resistors and do not constitute the Wheatstone bridge circuit. The diffusion layers 15 as the resistor layers not constituting the Wheatstone bridge circuit are also formed on both sides of the resistor layers of the Wheatstone bridge along the longitudinal direction. In other words, the dummy diffusion layers are formed in parallel in peripheral areas of the impurity diffusion resistors constituting the bridge circuit, the dummy diffusion layers having generally the same shape as the diffusion resistors.

The resistor layers constituting the Wheatstone bridge circuit are impurity diffusion layers which are the diffusion layers (dummy diffusion layers) not connected electrically to the circuit and formed in an area nearer to the subject resistor layer than another resistor layer. The resistor layers constituting the circuit is disposed sandwiched between the diffusion layers not connected to the circuit. Since the resistor 15 as the dummy diffusion layer is disposed in the peripheral area of each of four diffusion resistors constituting the Wheatstone bridge circuit, a difference of peripheral environments of the resistors can therefore be made small. The resistors 15 do not constitute the Wheatstone bridge circuit. The dummy diffusion layer has preferably generally the same shape as that of each of the four diffusion resistors constituting the bridge circuit. In order to form the same peripheral environments of the four diffusion resistors of the bridge circuit as much as possible, it is desirous that the dummy resistor is disposed on both sides of each diffusion resistor along the longitudinal direction and generally in parallel to the diffusion resistor. A dummy diffusion layer 16 is formed surrounding the four resistors constituting the bridge circuit. It is therefore possible to suppress irregular gas concentrations above the diffusion resistors when the shapes of other circuits disposed around the strain sensors are formed in the mask. It is therefore possible to realize uniform diffusion layers. A Wheatstone bridge circuit can be formed by making a difference of resistance values of all resistors as small as possible, so that a strain measurement precision can be improved. The dummy diffusion layers may be disposed only in the peripheral areas of the four resistors or only in the peripheral area of the bridge circuit. In these cases, the advantages that irregularity of gas concentration during mask etching is suppressed slightly. However, the area occupied by the strain sensors can be reduced and the positions of the four resistors of the bridge circuit become near to each other. It is therefore advantageous in that a variation in resistance values when the impurity diffusion layers are formed can be reduced.

The larger the resistance value of the diffusion layer becomes, the larger the resistance change becomes when a strain is applied and the more the measurement precision is improved. Further, since a current quantity flowing through the resistor becomes small, a low consumption power is realized. Since the resistance value is proportional to l/w where w is a width of the resistor and l is a length thereof, the resistance value can be made large by increasing l/w. However, if l/w is made large, the diffusion resistor has an elongated shape. In the Wheatstone bridge circuit of the present invention, it is desirous to form a diffusion layer in as narrow an area as possible in order to prevent a variation in diffusion concentrations in diffusion resistors from becoming large.

Figure 16:
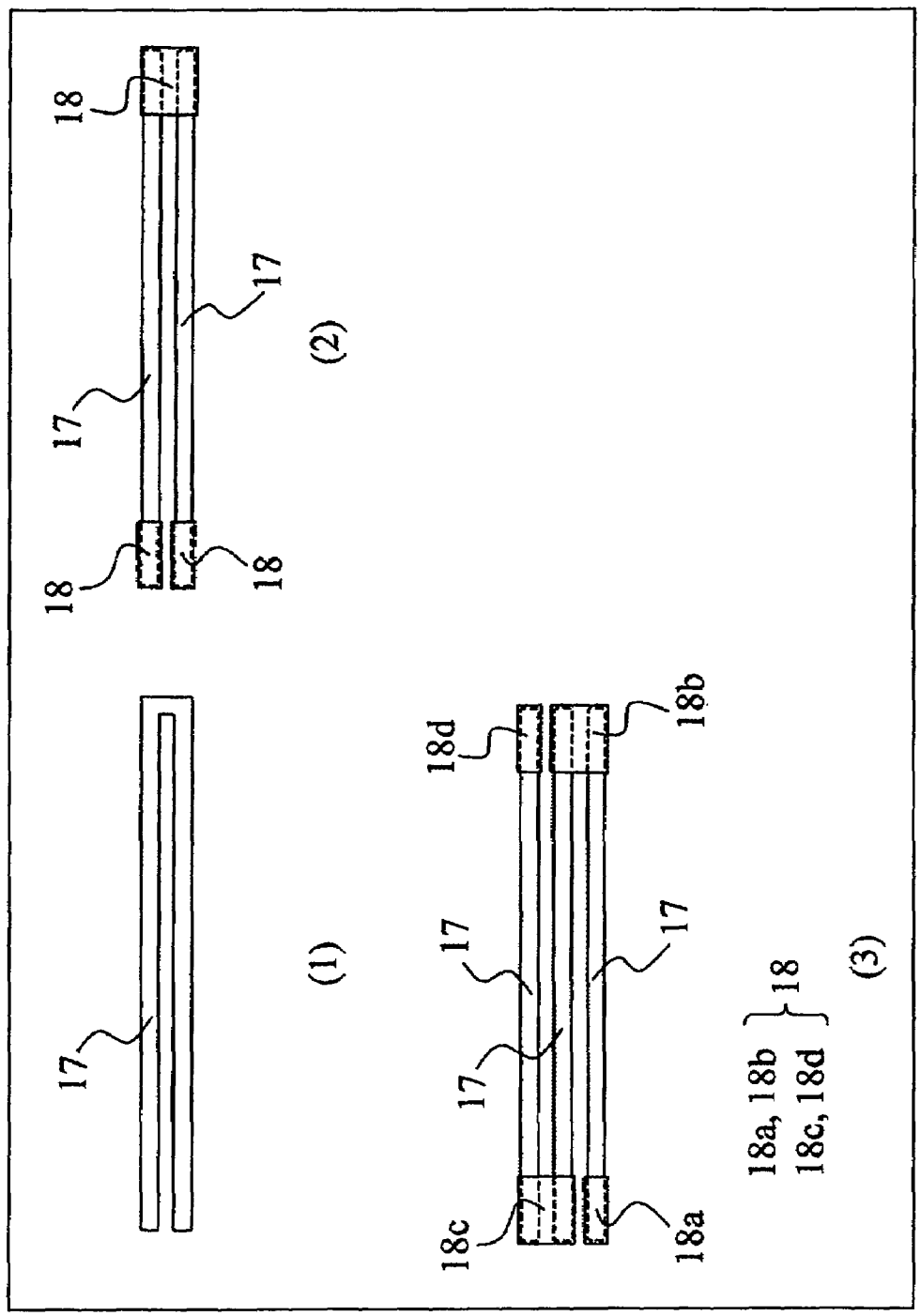
FIG. 16 is a diagram showing the structure of diffusion layers according to the fourth embodiment of the present invention.

To this end, as shown in FIG. 16, an impurity diffusion resistor 17 is turned back to reduce an area occupied by the diffusion resistor and suppress a variation in diffusion concentrations as much as possible. If there is a turned-back portion in one diffusion resistor, there is a difference of electron speed between the outer and inner peripheral areas of the turned-back corner portion. It becomes difficult to adjust the resistance value when the resistor is formed.

To solve this problem, as shown in FIG. 16(2) a resistor layer has linear portions constituted of the odd number of straight resistors 17 having the same longitudinal direction and the even number of coupling portions coupling the linear portions.

Straight resistors 17 are formed larger in number by one than the number of turned-back times. Adjacent diffusion resistors are connected by a via 18 of conductive material to form a turned-back resistor. By coupling the ends of adjacent straight resistors with the via of conductive material, a delay of an electron motion speed at the corner of the turned-back portion can be eliminated so that a target resistance value can be obtained at high precision. The via and diffusion resistors may be directly contacted or may be contacted via a silicide film. Since a variation in the resistance values of four diffusion resistors can be suppressed, it becomes possible to set the offset quantity in the non-strain state to 0 and strain quantity measurement of high reliability is possible. It is important that the via 18 has a small impedance relative to the diffusion resistor 17, and the material is not limited specifically to metal foil. As shown in FIG. 16(2), although the turned-back resistor is formed by connecting two straight resistors at one point, the number of turned-back times may be two or more. If the turned-back is performed a plurality of times, the area occupied by the whole length of the resistor can be made small so that a variation in the diffusion layer concentrations during an ion implantation process can be suppressed.

As shown in FIG. 16(3), the number of turned-back times is preferably the even umber of turned-back times using the odd number of straight resistors. The mechanical quantity measuring apparatus of the present invention obtains electromotive force through electromagnetic induction or external electromagnetic waves. Since the antenna 8 and Wheatstone bridge 102 are disposed in a fine area of the same substrate, the inside of the Wheatstone bridge is influenced by electromagnetic waves and there is a possibility that induction electromotive force is generated. According to the Farady's law, the electromagnetic induction is the phenomenon that as the magnetic force lines change passing through an area surrounded by a wiring, current flows through the wiring in a particular direction due to the influence of a change in the magnetic force change components. As a magnetic force changes in the turned-back resistor shown in FIG. 16(3) along a direction perpendicular to the drawing sheet, the current flowing through 18a-18b-18c has a direction opposite to that flowing through 18b-18c-18d. Therefore, these currents are cancelled out and the electromotive force generating noises during strain quantity measurement can be prevented from being generated, resulting in higher precision measurement.

Figure 17:
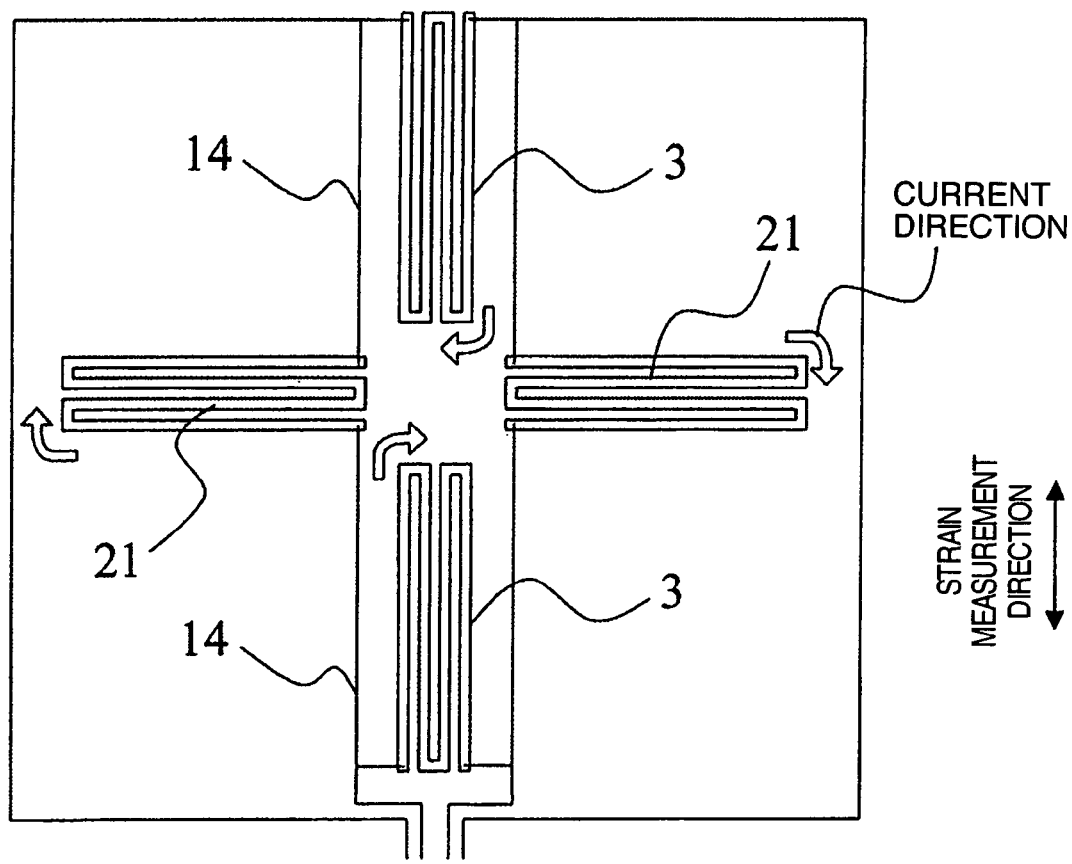
FIG. 17 is a diagram showing layout directions of diffusion layers according to the fourth embodiment of the present invention.
Figure 18:
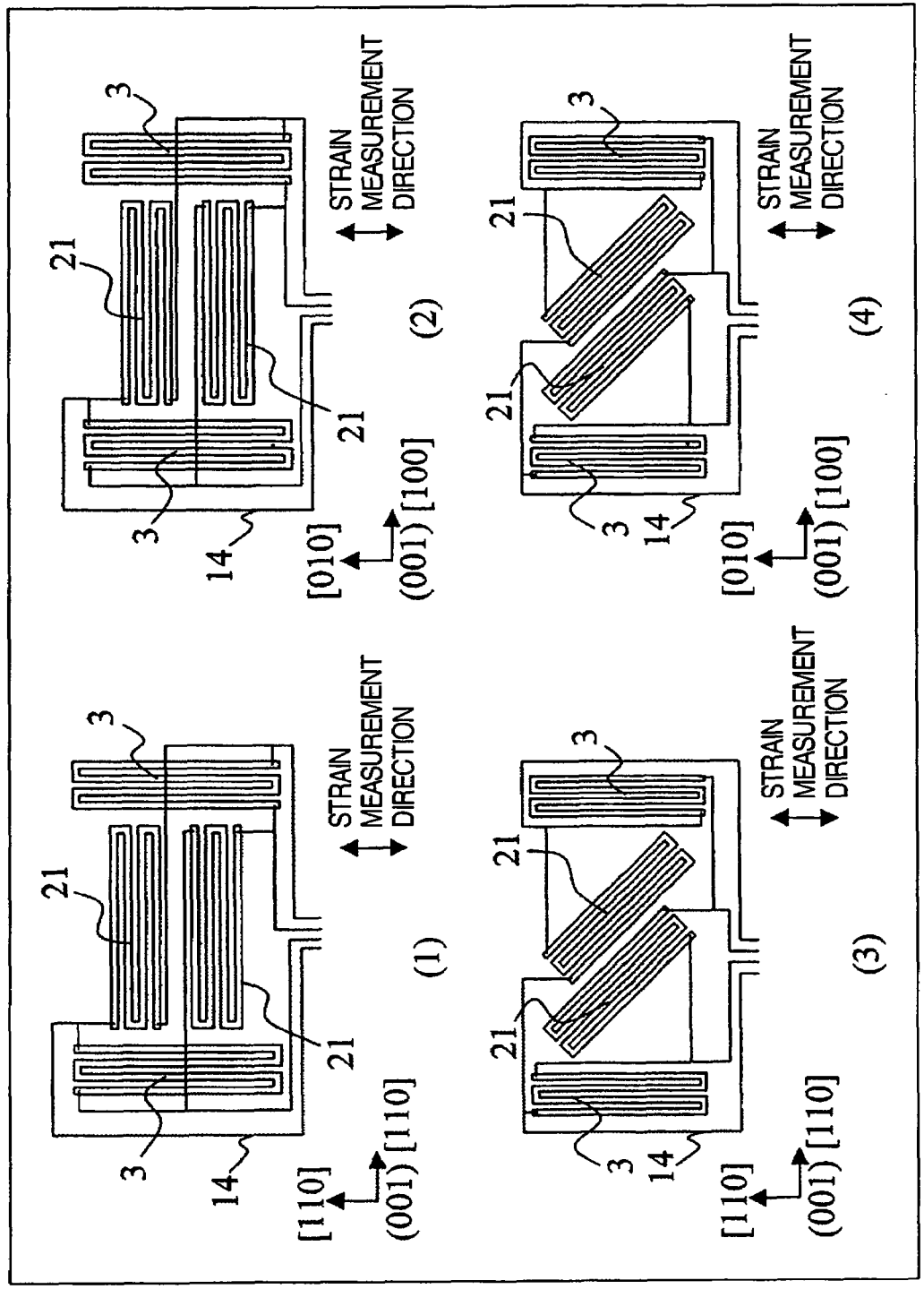
FIG. 18 is a diagram showing layout directions of diffusion layers according to the fourth embodiment of the present invention.

If the diffusion resistor constituting the bridge circuit made of four impurity diffusion resistors is formed by the even number of resistors and the turned-back is performed odd times, as shown in FIG. 17, optional two diffusion resistors are disposed in such a manner that the electromotive force is generated in remaining two diffusion resistors in the direction opposite to that of the electromotive force generated in the optional two diffusion resistors. In FIG. 17, arrows indicate the current flow directions when a change in the magnetic field occurs from the front to the back along the direction perpendicular to the drawing sheet. FIGS. 18(1) and 18(2) show examples of the layouts of p-type diffusion resistors and n-type diffusion resistors when strain sensors 3 and dummy resistors 21 are disposed at an angle of about 45°. FIGS. 18(3) and 18(4) show examples of the layouts of p-type diffusion resistors and n-type diffusion resistors when strain sensors 3 and dummy resistors 21 are disposed at an angle of about 90°. The shapes of the diffusion resistors constituting the Wheatstone bridge and the pickup positions of wirings are in rotation symmetry. Namely, in FIG. 18, as the Wheatstone bridge is rotated by 180° around the center of gravity of the resistors as a rotation center, the diffusion resistors are superposed upon the original diffusion resistor shapes. Alternatively, even if the diffusion resistors are not superposed upon the original diffusion resistor shapes, the pickup directions of the wirings of the diffusion resistors are coincident.

Strain information detected with the strain sensor 3 may be transmitted to the external by using the circuits such as the analog/digital convertor 5, rectifier/detector/modem circuit 6, communication control unit 7, and power supply device 10. In this case, the circuits such as the analog/digital convertor 5, rectifier/detector/modem circuit 6, and communication control unit 7 are formed on the same silicon substrate as that of the strain sensor 3. These circuits include a number of diffusion resistors as electric resistors of the circuits. If a strain is applied to the silicon substrate 2, the specific resistance of these diffusion resistors change and there is a possibility that the circuits do not operate normally. The strain sensitivity of the diffusion layer can be reduced and a normal operation of the mechanical quantity measuring apparatus can be guaranteed, by setting the longitudinal direction of each diffusion resistor constituting the circuits such as the analog/digital convertor 5, rectifier/detector/modem circuit 6, and communication control unit 7 to the <100> direction of silicon crystal for the p-type diffusion layers, and to the <110> direction of silicon crystal for the n-type diffusion layers.

The embodiments have been described above. The invention is not limited only to the above embodiments. It will be apparent to those skilled in the art that other various modifications, alterations can be made in the range of the spirit of the present invention and the scope of claims.

The invention claimed is:

1. A mechanical quantity measuring apparatus having a strain detector formed on a single crystal semiconductor substrate for detecting a strain, and bonded to or buried in an object to be measured to measure a strain, wherein:
   a Wheatstone bridge circuit including four strain sensor resistors having almost an equal resistance value and formed on a principal surface of said semiconductor substrate; and
   said strain sensor resistors include a plurality of diffusion resistor layers and vias or wirings for connecting said plurality of diffusion resistor layers,
   wherein each of said strain sensor resistors includes an odd number of said diffusion resistor layers disposed in parallel and connected by an even number of said vias, said diffusion resistor layers being of a straight line shape and turned back by way of said vias.

2. A mechanical quantity measuring apparatus having a strain detector formed on a single crystal semiconductor substrate for detecting a strain, and bonded to or buried in an object to be measured to measure a strain, wherein:
   a Wheatstone bridge circuit including four strain sensor resistors having almost an equal resistance value and formed on a principal surface of said semiconductor substrate; and
   current pickup portions formed between diffusion resistor layers constituting said strain sensor resistors and wirings are generally in rotation symmetry,
   wherein each of the four strain sensors comprises two pairs, each pair located in a longitudinal direction, different from the other pair, along which a diffusion impurity layer has been formed.

* * * * *